US 6,636,639 B1

United States Patent
Terashima

(10) Patent No.: US 6,636,639 B1
(45) Date of Patent: Oct. 21, 2003

(54) IMAGE RECORDING APPARATUS, IMAGE RECORDING METHOD AND STORAGE MEDIUM

(75) Inventor: Yoshihiro Terashima, Hiratsuka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/534,094

(22) Filed: Mar. 23, 2000

(30) Foreign Application Priority Data

Apr. 1, 1999 (JP) .......................................... 11-095284
Apr. 1, 1999 (JP) .......................................... 11-095285

(51) Int. Cl.[7] ................................................. G06K 9/36
(52) U.S. Cl. ..................................................... 382/232
(58) Field of Search ................................ 382/232–251; 348/384.1, 394.1, 395.1, 400.1–404.1, 407.1–416.1, 420.1–421.1, 425.2, 430.1, 431.1

(56) References Cited

U.S. PATENT DOCUMENTS

| | | | | |
|---|---|---|---|---|
| 4,490,848 A | * | 12/1984 | Beall et al. ................. | 382/121 |
| 4,785,349 A | * | 11/1988 | Keith et al. ................. | 358/136 |
| 4,797,729 A | * | 1/1989 | Tsai ............................. | 358/13 |
| 5,122,873 A | * | 6/1992 | Golin .......................... | 358/133 |
| 5,539,535 A | * | 7/1996 | Aizawa et al. .............. | 358/468 |
| 5,581,311 A | * | 12/1996 | Kuroiwa ..................... | 348/231 |
| 5,754,231 A | * | 5/1998 | Odaka et al. ............... | 348/390 |
| 5,768,446 A | * | 6/1998 | Reasoner et al. .......... | 382/304 |
| 5,923,385 A | * | 7/1999 | Mills et al. ................. | 348/715 |

* cited by examiner

Primary Examiner—Jose L. Couso
(74) Attorney, Agent, or Firm—Morgan & Finnegan, L.L.P.

(57) ABSTRACT

An image recording apparatus which realizes, at low cost, both an increased number of serially sensed frames and increased speed of serial image sensing. The image recording apparatus comprises: a photoelectric converter for converting light from an object to an electric signal; a first temporary storage for temporarily storing data outputted by the photoelectric converter; an image processor for performing image processing, including compression processing, on the data read out of the first temporary storage; a second temporary storage for temporarily storing the data, on which image processing has been performed by the image processor; and a recording device for recording the data, read out of the second temporary storage, in a recording medium.

18 Claims, 6 Drawing Sheets

IMAGE RECORDING APPARATUS, IMAGE RECORDING METHOD AND STORAGE MEDIUM

FIELD OF THE INVENTION

The present invention relates to an image recording apparatus such as a digital camera or the like.

BACKGROUND OF THE INVENTION

Conventionally, an image recording apparatus picks up an image by a photoelectric converter, e.g., CCD or the like, then performs image processing including compression processing, and records the image data in a recording medium such as a PC card, hard disc or the like. Assume a case of using an image recording apparatus of this type, wherein the processing speed of the CCD is the fastest, the processing speed of image processing is the next fastest, and the access speed of a recording medium, e.g., PC card or the like, is the slowest. In order for image sensing speed to not fall behind the CCD's processing speed, a temporary storage may be provided in the process. As a method of providing a temporary storage, the following two methods may be considered.

<Method 1>

An image sensed by a CCD is stored in a temporary storage before image processing is performed. The image data is read out of the temporary storage and then image processing is performed while the processed image being written in a PC card.

<Method 2>

An image sensed by a CCD is stored in a temporary storage after image processing is performed. The image data is sequentially read out of the temporary storage and written in a PC card.

According to Method 1 of the above two methods, since a memory having the faster access speed than the CCD's processing speed is generally available, it is possible to write image data, sensed by the CCD, in a temporary storage memory without reducing the CCD's processing speed. However, because image data is temporarily stored before compression processing is performed, if the number of frames sensed serially is to be increased, a large memory capacity is required.

On the contrary, according to Method 2, since image data is stored in a temporary storage memory after image processing including compression processing is performed, a larger number of frames can be serially sensed and stored in the same memory capacity compared to Method 1. However, because the CCD's processing speed depends upon the speed of image processing, if the image processing speed is slower than the CCD's processing speed, the CCD's processing capability cannot fully be utilized. Thus, the speed of serial image sensing according to Method 2 is slower than that of Method 1.

As described above, Method 1 is disadvantageous in terms of the number of frames sensed serially, and Method 2 is disadvantageous in terms of the speed of serial image sensing.

SUMMARY OF THE INVENTION

The present invention has been proposed to solve the above conventional problems, and has as its object to provide an image recording apparatus, image recording method and storage medium, which can increase the number of serially sensed frames and increase the speed of serial image sensing at low cost.

In order to solve the foregoing problems and attain the above object, an image recording apparatus of the present invention has the following configuration according to its first aspect.

More specifically, the image recording apparatus comprises: photoelectric conversion means for converting light from an object to an electric signal; first temporary storage means for temporarily storing data outputted by the photoelectric conversion means; image processing means for performing image processing, including compression processing, on the data read out of the first temporary storage means; second temporary storage means for temporarily storing the data, on which image processing has been performed by the image processing means; and recording means for recording the data, read out of the second temporary storage means, in a recording medium.

Furthermore, an image recording method of the present invention has the following configuration according to its first aspect.

More specifically, the image recording method comprises: a photoelectric conversion step of converting light from an object to an electric signal; a first temporary storage step of temporarily storing data obtained in the photoelectric conversion step; an image processing step of reading the data, stored in the first temporary storage step, and performing image processing, including compression processing, on the read data; a second temporary storage step of temporarily storing the data, on which image processing has been performed in the image processing step; and a recording step of reading the data, stored in the second temporary storage step, and recording the read data in a recording medium.

Furthermore, a storage medium of the present invention has the following configuration according to its first aspect.

More specifically, the storage medium storing a control program for controlling an image recording apparatus, said control program includes: program code means for a photoelectric conversion step of converting light from an object to an electric signal; program code means for a first temporary storage step of temporarily storing data obtained in the photoelectric conversion step; program code means for an image processing step of reading the data, stored in the first temporary storage step, and performing image processing, including compression processing, on the read data; program code means for a second temporary storage step of temporarily storing the data, on which image processing has been performed in the image processing step; and program code means for a recording step of reading the data, stored in the second temporary storage step, and recording the read data in a recording medium.

Furthermore, an image recording apparatus of the present invention has the following configuration according to its second aspect.

More specifically, the image recording apparatus comprises: photoelectric conversion means for converting light from an object to an electric signal; a first compression processor for compressing data outputted by the photoelectric conversion means; first temporary storage means for temporarily storing the data compressed by the first compression processor; a decompression processor for decompressing the compressed data read out of the first temporary storage means; first switch means for selectively transferring the data decompressed by the decompression processor, or the data on which decompression processing is not performed, to a circuit of the subsequent step; image processing means for receiving the data from the first switch means and performing image processing including second compression processing; second switch means for selectively transferring the data on which image processing has been performed by the image processing means, or the data on which image processing is not performed by the image processing means, to a circuit of the subsequent step; second temporary storage means for receiving the data from the second switch means and temporarily storing the received data; and recording means for recording the data, read out of the second temporary storage means, in a recording medium.

Furthermore, an image recording apparatus of the present invention has the following configuration according to its third aspect.

More specifically, the image recording apparatus comprises: photoelectric conversion means for converting light from an object to an electric signal; a first compression processor for compressing data outputted by the photoelectric conversion means; first temporary storage means for temporarily storing the data compressed by the first compression processor; a decompression processor for decompressing the compressed data read out of the first temporary storage means; image processing means for receiving the data from the decompression processor and performing image processing including second compression processing; second temporary storage means for temporarily storing two types of data: data which has been read out of the first temporary storage means and not processed by the decompression processor or the image processing means, and data which has been processed by the decompression processor and the image processing means; and recording means for recording the two types of data, read out of the second temporary storage means, in a recording medium.

Furthermore, an image recording method of the present invention has the following configuration according to its second aspect.

More specifically, the image recording method comprises: a photoelectric conversion step of converting light from an object to an electric signal; a first compression processing step of compressing data obtained in the photoelectric conversion step; a first temporary storage step of temporarily storing the data compressed in the first compression processing step; a decompression processing step of reading the compressed data stored in the first temporary storage step and decompressing the data; a first switching step of selectively transferring the data decompressed in the decompression step, or the data on which decompression processing is not performed, to a circuit of the subsequent step; an image processing step of receiving the data from the first switching step and performing image processing including second compression processing; a second switching step of selectively transferring the data on which image processing has been performed in the image processing step, or the data on which image processing is not performed in the image processing step, to a circuit of the subsequent step; a second temporary storage step of receiving the data from the second switching step and temporarily storing the received data; and a recording step of reading the data stored in the second temporary storage step and recording the read data in a recording medium.

Furthermore, an image recording method of the present invention has the following configuration according to its third aspect.

More specifically, the image recording method comprises: a photoelectric conversion step of converting light from an object to an electric signal; a first compression processing step of compressing data obtained in the photoelectric conversion step; a first temporary storage step of temporarily storing the data compressed in the first compression processing step; a decompression processing step of reading the compressed data stored in the first temporary storage step and decompressing the read data; an image processing step of receiving the data from the decompression processing step and performing image processing including second compression processing; a second temporary storage step of temporarily storing two types of data; data which has been stored in the first temporary storage step, then read out, and not processed in the decompression processing step or the image processing step, and data which has been processed in the decompression processing step and the image processing step; and a recording step of reading the two types of data stored in the second temporary storage step and recording the read data in a recording medium.

Furthermore, a storage medium of the present invention has the following configuration according to its second aspect.

More specifically, the storage medium, storing a control program for controlling an image recording apparatus, said control program includes: program code means for a photoelectric conversion step of converting light from an object to an electric signal; program code means for a first compression processing step of compressing data obtained in the photoelectric conversion step; program code means for a first temporary storage step of temporarily storing the data compressed in the first compression processing step; program code means for a decompression processing step of reading the compressed data stored in the first temporary storage step and decompressing the data; program code means for a first switching step of selectively transferring the data decompressed in the decompression step, or the data on which decompression processing is not performed, to a circuit of the subsequent step; program code means for an image processing step of receiving the data from the first switching step and performing image processing including second compression processing; program code means for a second switching step of selectively transferring the data on which image processing has been performed in the image processing step, or the data on which image processing has not been performed in the image processing step, to a circuit of the subsequent step; program code means for a second temporary storage step of receiving the data from the second switching step and temporarily storing the received data; and program code means for a recording step of reading the data stored in the second temporary storage step and recording the read data in a recording medium.

Furthermore, a storage medium of the present invention has the following configuration according to its third aspect.

More specifically, the storage medium, storing a control program for controlling an image recording apparatus, said control program includes: program code means for a photoelectric conversion step of converting light from an object to an electric signal; program code means for a first compression processing step of compressing data obtained in the photoelectric conversion step; program code means for a first temporary storage step of temporarily storing the data compressed in the first compression processing step; program code means for a decompression processing step of reading the compressed data stored in the first temporary storage step and decompressing the read data; program code means for an image processing step of receiving the data from the decompression processing step and performing image processing including second compression processing; program code means for a second temporary storage step of temporarily storing two types of data; data which has been stored in the first temporary storage step, then read out, and not processed in the decompression processing step or the image processing step, and data which has been processed in the decompression processing step and the image processing step; and program code means for a recording step of reading the two types of data stored in the second temporary storage step and recording the read data in a recording medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
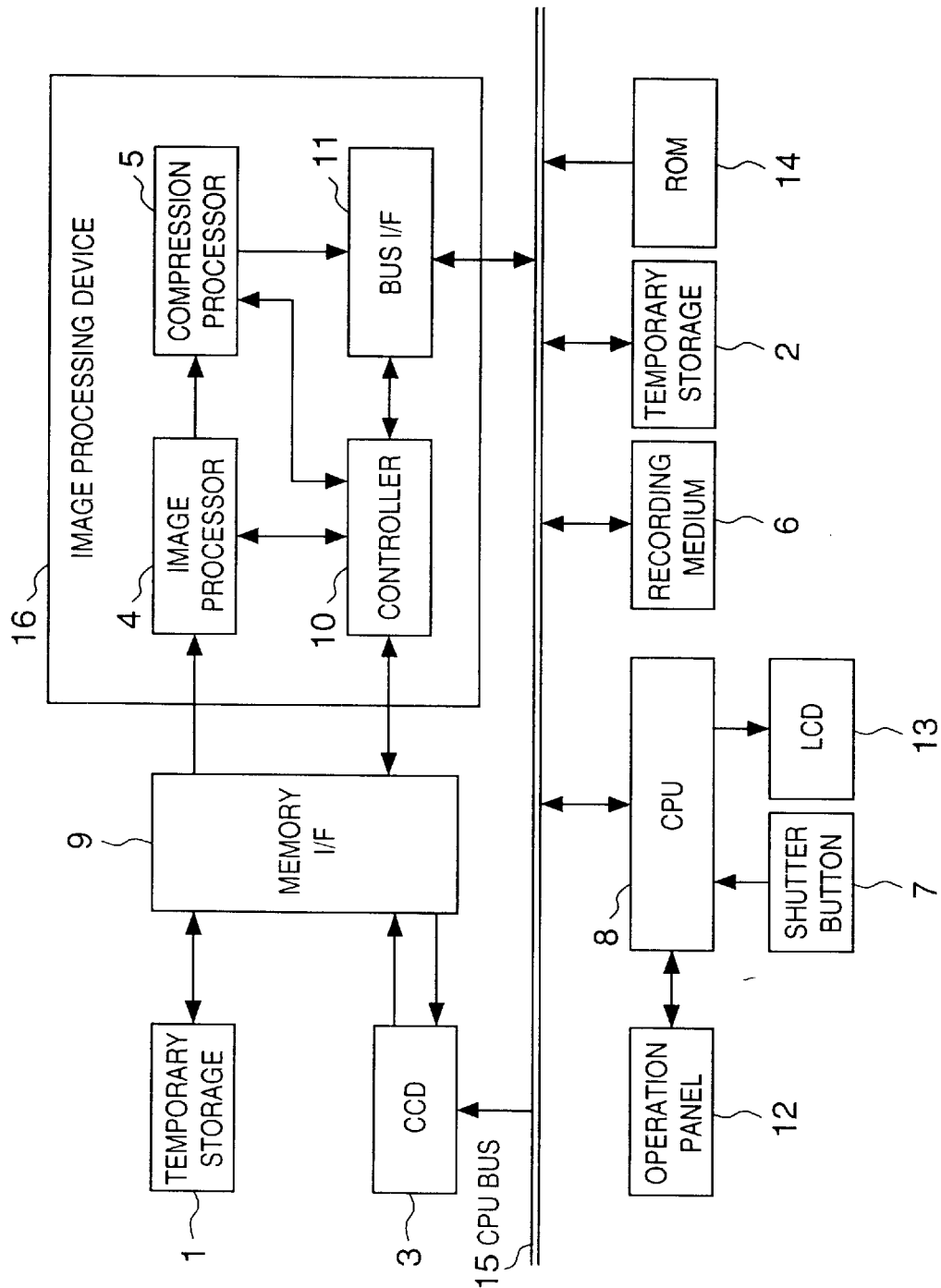
FIG. 1 is a block diagram showing a configuration of an image recording apparatus according to the first embodiment of the present invention.

FIG. 1 is a block diagram showing an image recording apparatus according to the first embodiment of the present invention.

Figure 2:
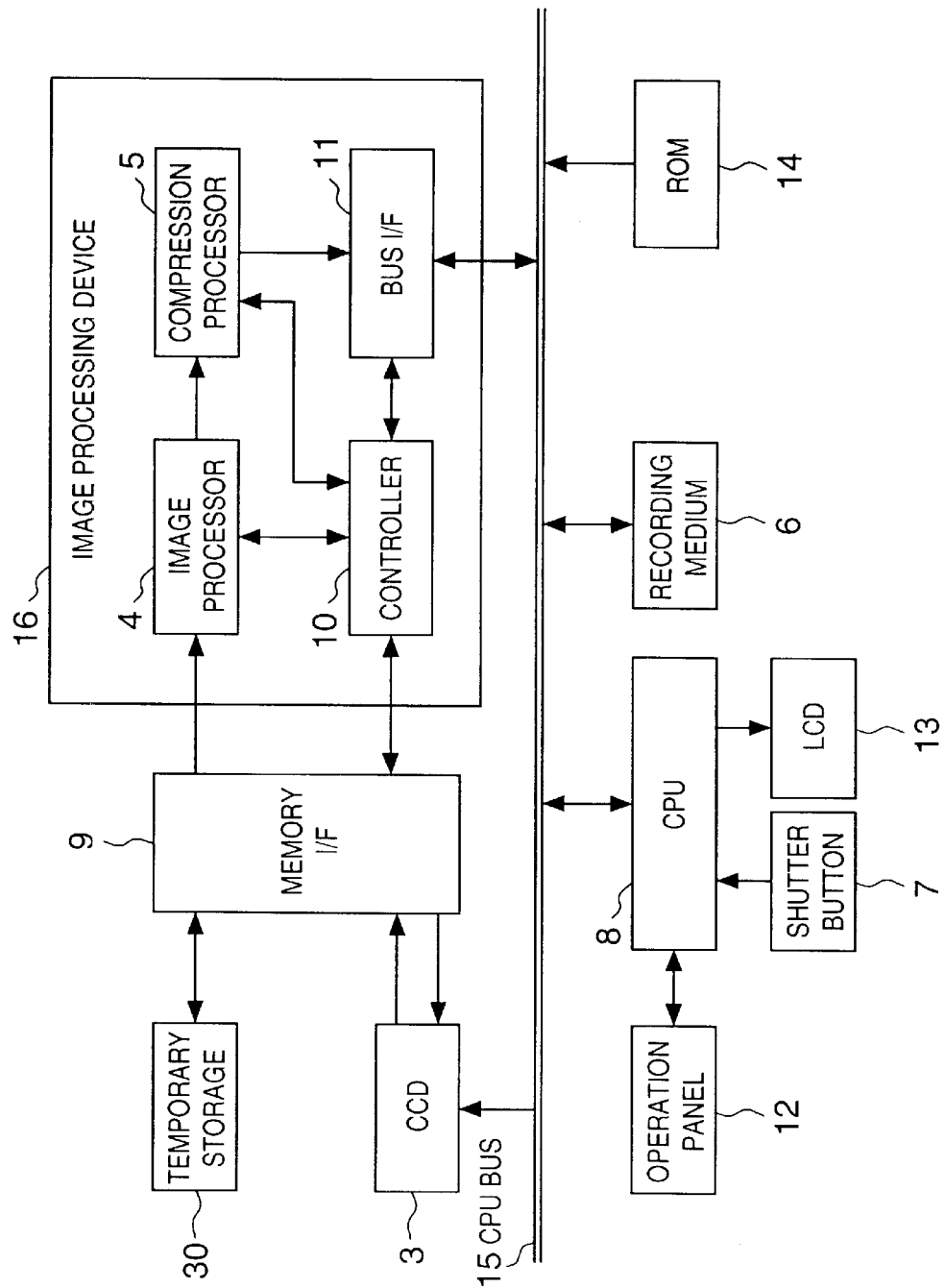
FIG. 2 is a block diagram showing a conventional image processing apparatus.
Figure 3:
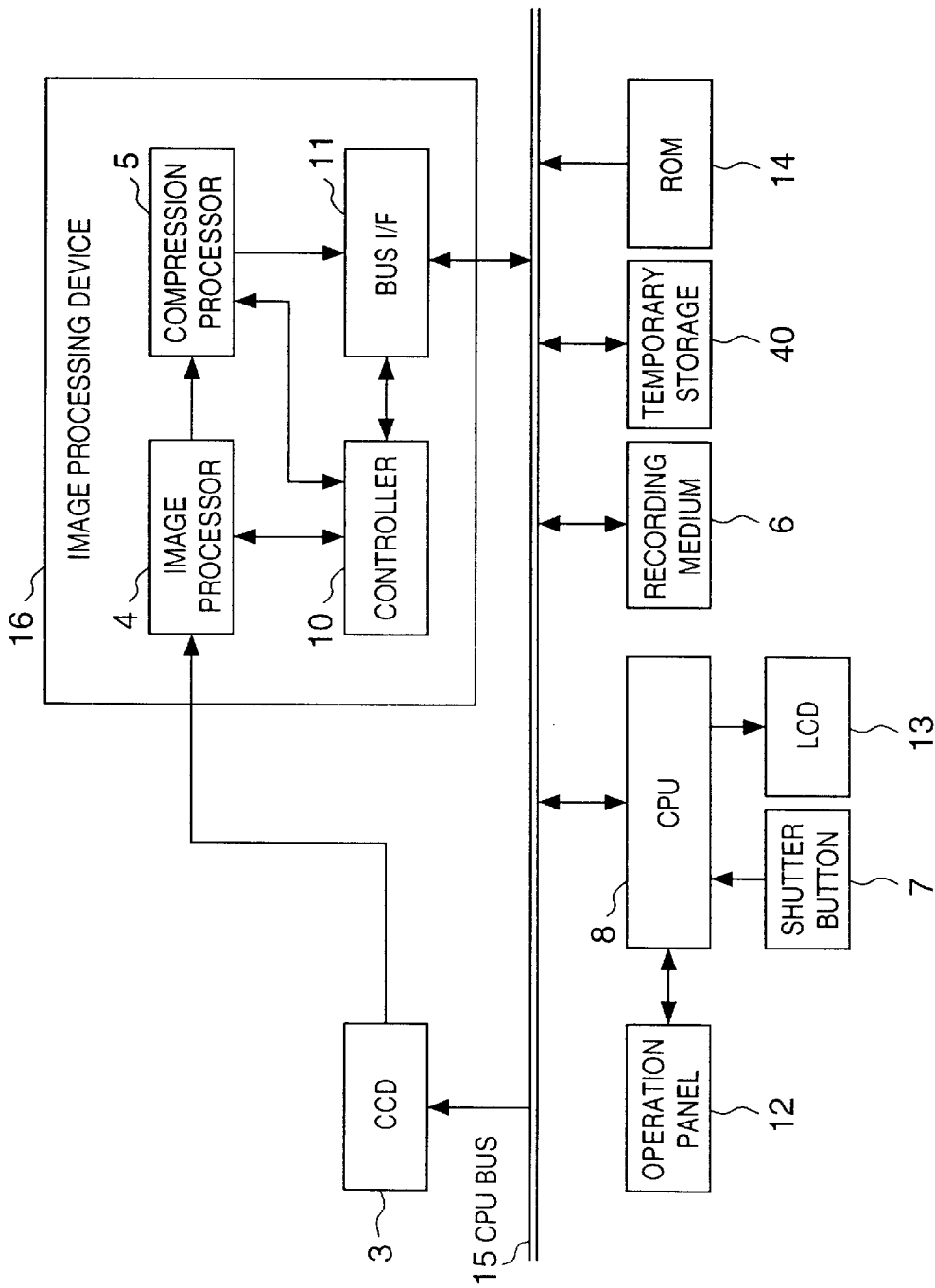
FIG. 3 is a block diagram showing a conventional image processing apparatus.

For the same structural components, common reference numerals are assigned in FIGS. 1, 2 and 3. FIGS. 2 and 3 show a configuration of conventional image recording apparatuses. Hereinafter, FIG. 1 will be described in comparison with FIGS. 2 and 3.

Referring to FIG. 1, a shutter button 7 is monitored by a CPU 8. When the shutter button 7 is depressed, the CPU 8 turns on a CCD 3 for sensing an image. The sensed image is stored in a temporary storage 1 through a memory I/F 9 without reducing the processing speed of the CCD 3. Herein, the CCD 3 is capable of reading at high speed by virtue of having, for instance, two read lines. When a predetermined amount of data is accumulated in the temporary storage 1, the accumulated data is transferred to an image processing device 16 through the memory I/F 9. Note that the temporary storage 1 is connected to a bus which is different from a CPU bus 15 for the purpose to increase the access speed. The configuration shown in FIG. 3 does not include the temporary storage 1 and memory I/F 9. Thus, an image sensed by the CCD 3 is directly transferred to the image processing device 16.

In the image processing device 16, an image processor 4 performs image processing such as white balance processing, γ conversion processing or the like. Then, a compression processor 5 performs data compression and the data is transferred to the CPU bus 15 through a bus I/F 11.

The data transferred to the CPU bus 15 is temporarily stored in a temporary storage 2. The CPU 8 monitors the temporary storage 2. When a predetermined amount of data is accumulated in the temporary storage 2, the accumulated data is transferred to a recording medium 6 through the CPU bus 15. Herein, the recording medium 6 is, for instance, a PC card or hard disc or the like. The image recording apparatus according to the first embodiment comprises recording means for recording data in a recording medium of this type. The configuration shown in FIG. 2 does not include the temporary storage 2. Thus, data transferred to the CPU bus 15 is directly stored in the recording medium 6 via the CPU 8.

The image data stored in the recording medium 6 can be displayed on a liquid crystal display (LCD) 13 via the CPU 8. An image to be displayed can be selected by an operation panel 12. The operation panel 12 is also used for setting various parameters for the image processing device. In the ROM 14, commands and programs for operating the CPU 8 are stored.

The temporary storages 1 and 2 are configured with, for instance, SDRAM, and have a sufficiently fast access speed for accessing other processing units. Thus, processing does not congest in the temporary storages 1 and 2. Moreover, the storage capacity of the temporary storages 1 and 2 can be changed.

Assume that serial image sensing is performed by the CCD 3, having three million pixels (1 byte/pixel, 3 mega-bytes/frame) and processing speed of 50 mega-bytes/second. Also assume that the processing speed of the image processing device 16 is 30 mega-bytes/second, and access speed of the recording medium 6 is 3 mega-bytes/second. Hereinafter, a comparison is made between FIGS. 1, 2 and 3 with regard to the speed of serial image sensing and the number of serially sensed frames.

Assume that the capacity of each of the temporary storage 30 in FIG. 2 and the temporary storage 40 in FIG. 3 is 64 mega-bytes, and the capacity of each of the temporary storages 1 and 2 in FIG. 1 is 32 mega-bytes. Thus, the total capacity of temporary storage is equal in all systems of FIGS. 1, 2 and 3.

First, the speed of serial image sensing in FIG. 2 is obtained. In this case, the speed of serial image sensing is determined by the CCD's processing speed as in the following equation:

50 mega-bytes/second÷3 mega-bytes/frame=16.7 frames/second

Next, the number of serially sensed frames (the number of frames which can be serially sensed in one sequence) is calculated. The number of serially sensed frames is determined by the sum of: the number of frames which can be stored in the temporary storage 30, and the number of frames which can be written in the recording medium 6 during the serial-image-sensing period. However, the access speed of the recording medium 6, i.e., 3 mega-bytes/second, is far slower than other processing speed. In addition, since the recording medium 6 is connected to the CPU bus 15, the access speed may be even slower if bus share is taken into consideration. Therefore, the access speed of the recording medium 6 is slow enough to be negligible, in other words, data is rarely written in the recording medium 6 during the serial-image-sensing period. Because of the foregoing reason, the number of serially sensed frames is calculated based only upon the capacity of the temporary storage 30 as in the following equation:

64 mega-bytes÷3 mega-bytes/frame=21.3 frames

Next, the speed of serial image sensing in FIG. 3 is obtained. In this case, the speed of serial image sensing is determined by the processing speed of the image processing device as in the following equation:

30 mega-bytes/second÷3 mega-bytes/frame=10 frames/second

The number of serially sensed frames is determined by the number of frames which can be stored in the temporary storage 40. Assume that the access speed of the temporary storage 40 is sufficiently faster than the processing speed of the image processing device 16. Also, similar to the case of FIG. 2, the access speed of the recording medium 6 is ignored. Assuming a case where data is compressed to ½ by the compression processor 5 of the image processing device, the number of serially sensed frames is calculated as follows:

64 mega-bytes÷(3 mega-bytes/frame×½)=42.7 frames

Finally, the speed of serial image sensing according to the first embodiment shown in FIG. 1 is obtained. The speed of serial image sensing is the same as that of FIG. 2, i.e., 16.7 frames/second.

To determine the number of serially sensed frames, the number of frames which can be stored in the temporary storage 1 is first calculated as follows:

32 mega-bytes÷3 mega-bytes/frame=10.7 frames

Then, time required before the temporary storage 1 becomes full is obtained as follows:

32 mega-bytes÷(50 mega-bytes/second−30 mega-bytes/second)= 1.6 seconds

While calculating the above values, the number of frames, which can be outputted from the image processing device 16 to the temporary storage 2, is obtained by the following equation:

1.6 seconds×30 mega-bytes/second÷(3 mega-bytes/frame×½)=32 frames

The number of frames which can be stored in the temporary storage 2 is obtained as follows:

32 mega-bytes÷(3 mega-bytes/frame×½)=21.3 frames

In other words, the temporary storage 2 becomes full before storing 32 frames, i.e., becomes full at the 21st frame. After the temporary storage 2 becomes full, the temporary storage 1 stores 10 frames (strictly speaking, 10.7 frames) at the same serial-image-sensing speed until the temporary storage 1 becomes full. Therefore, the number of serially sensed frames in FIG. 1 is obtained by the following equation:

10 frames+21 frames=31 frames

In summary, in FIG. 2, the speed of serial image sensing is 16.7 frames/second and the number of serially sensed frames is 21 frames. In FIG. 3, the speed of serial image sensing is 10 frames/second and the number of serially sensed frames is 42 frames. In FIG. 1, the speed of serial image sensing is 16.7 frames/second and the number of serially sensed frames is 31 frames.

As set forth above, according to the first embodiment, faster speed of serial image sensing and a larger number of serially sensed frames than that of the conventional example can be realized without increasing a memory capacity. Furthermore, the speed of serial image sensing and the number of serially sensed frames achieved conventionally can be realized with a smaller memory capacity according to the first embodiment. Thus, the system can be realized at low cost.

Note in the first embodiment, if a large number of frames is to be serially sensed while maintaining fast serial-image-sensing speed, the capacity of the temporary storage 1 may be increased. In a case where the number of serially sensed frames is to be increased at the expense of fast serial-image-sensing speed, or in a case of sensing an image which can only be compressed at low compression rate, thus requiring a relatively large frame capacity, the capacity of the temporary storage 2 may be increased.

[Second Embodiment]

Figure 4:
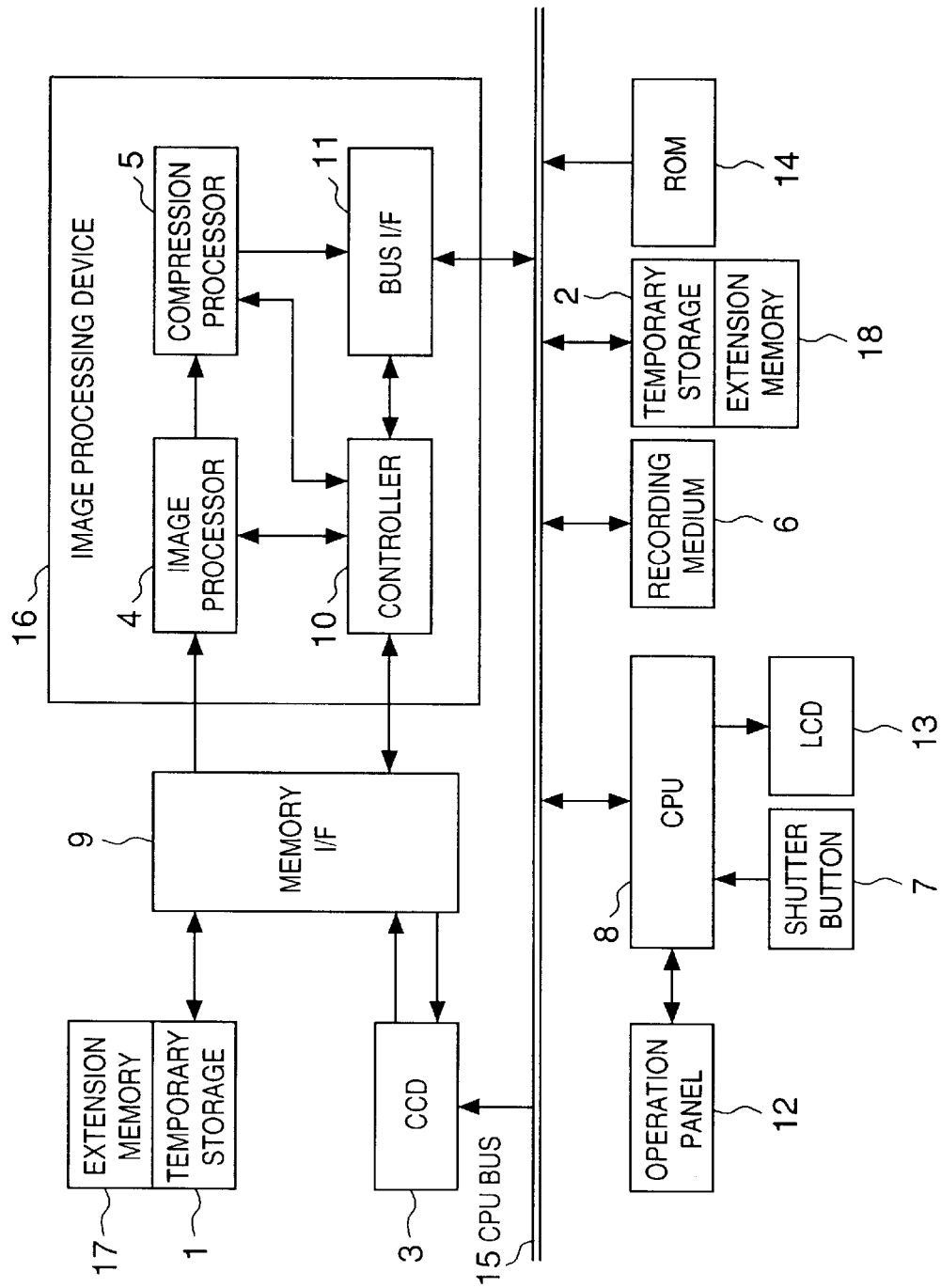
FIG. 4 is a block diagram showing an image recording apparatus according to the second embodiment of the present invention.

FIG. 4 is a block diagram showing an image recording apparatus according to the second embodiment of the present invention. In FIG. 4, components identical to those in FIG. 1 are referred to by the same reference numerals and detailed description thereof will be omitted.

In the second embodiment, extension memories 17 and 18 are respectively provided to the temporary storages 1 and 2.

In order to reduce the initial cost of the image recording apparatus of the second embodiment, each of the temporary storages 1 and 2 has a minimum capacity, for example, a capacity for storing one frame of image. For a user who desires a large number of serially sensed frames at high speed, the extension memory 17 is added. For a user who desires a large number of serially sensed frames but does not require high speed, the extension memory 18 is added.

As described above, according to the second embodiment, the speed of serial image sensing and the number of serially sensed frames desired by a user can be achieved at low cost.

[Third Embodiment]

In the third embodiment, the most appropriate compression rate is obtained by referring to FIG. 1, assuming that the temporary storages 1 and 2 both have a fixed capacity of 32 mega-bytes.

Time required before the temporary storage 1 becomes full is calculated to be 1.6 seconds in the first embodiment. The amount of data which can be processed by the image processing device 16 during this time is obtained as follows:

30 mega-bytes/second×1.6 seconds=48 mega-bytes

The capacity of the temporary storage 2 is 32 mega-bytes. Therefore, the compression rate required for the compression processor 5 is:

32 mega-bytes÷48 mega-bytes×100=about 67%

The compression processor 5 performs compression by using, for instance, a quantization table. The CPU 8 can set a quantization table, corresponding to the obtained compression rate, in the controller 10 through the CPU bus 15 and bus I/F 11. The compression processor 5 performs compression processing by utilizing the quantization table written in the controller 10.

As in the foregoing description, in a case where the memory capacity is fixed, a quantization table, obtained by calculation based on the memory capacity, may be provided. By this, the memory can be efficiently used.

As set forth above, according to the above-described first to third embodiments, high-speed serial image sensing and a large number of serially sensed frames can be achieved at low cost.

[Fourth Embodiment]

Figure 5:
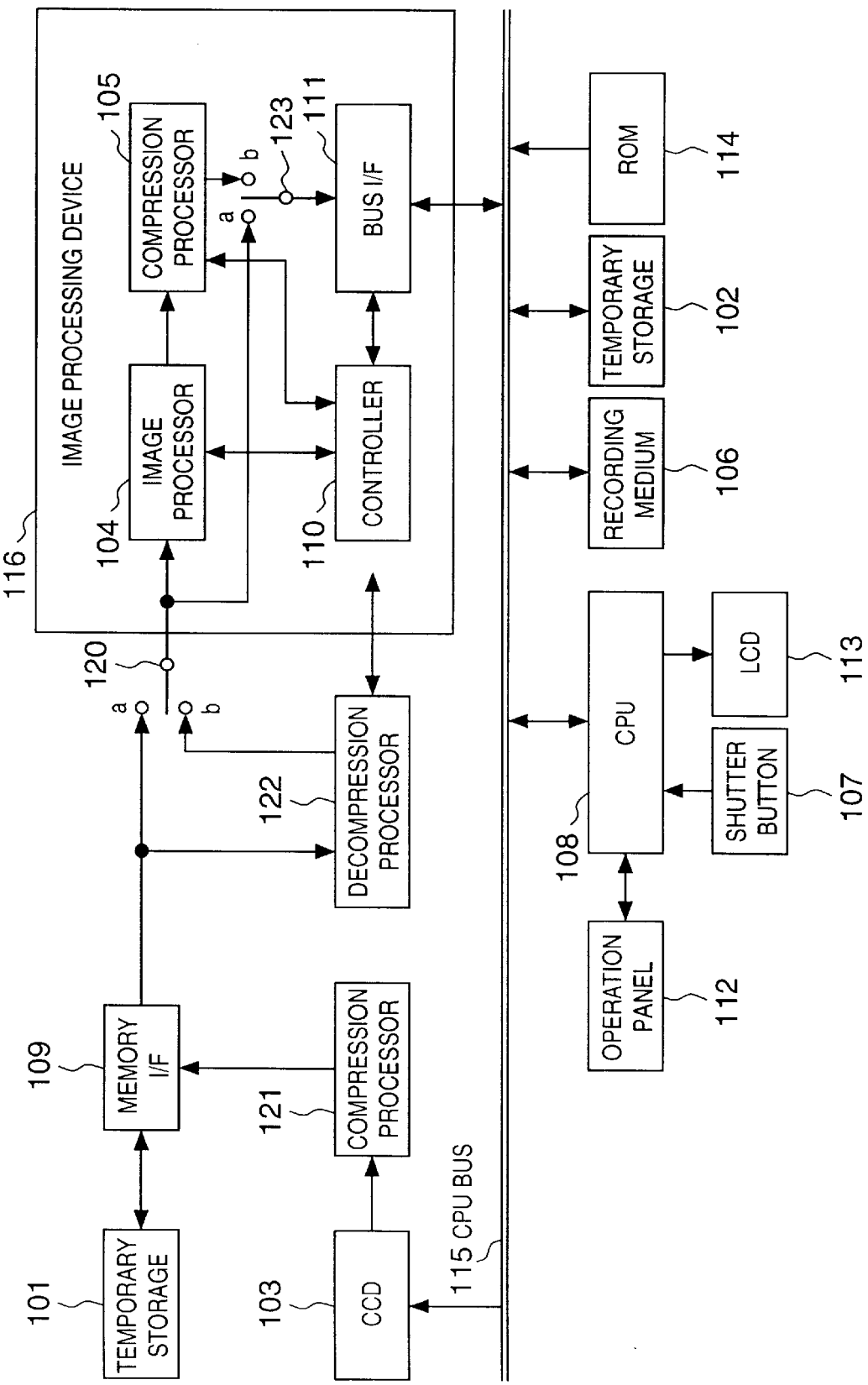
FIG. 5 is a block diagram showing an image recording apparatus according to the fourth embodiment of the present invention.

FIG. 5 is a block diagram showing an image recording apparatus according to the fourth embodiment of the present invention.

Referring to FIG. 5, a shutter button 107 is monitored by a CPU 108. When the shutter button 107 is depressed, the CPU 108 turns on a CCD 103 for sensing an image. The sensed image data is compressed by a compression processor 121 and stored in a temporary storage 101 through a memory I/F 109 without reducing the processing speed of the CCD 103. Assume that the processing speed of the compression processor 121 is sufficiently faster than the processing speed of the CCD 103. Furthermore, assume that the access speed of the temporary storage 101 is even faster than the processing speed of the compression processor 121. Herein, the CCD 103 is capable of reading at high speed by virtue of having, for instance, two read lines. Furthermore, the temporary storage 101 is connected to a bus which is different from a CPU bus 115 for the purpose to increase the access speed.

When data, on which image processing is not performed by an image processor 104, is to be compressed and stored in a recording medium 106, switches 120 and 123 are respectively connected to position a. When a predetermined amount of data is accumulated in the temporary storage 101, the accumulated data is read out of the temporary storage 101 and transferred to the CPU bus 115 through the memory I/F 109 and bus I/F 111, without being transferred to the image processor 104 and compression processor 105 of the image processing device 116.

On the other hand, when data, on which image processing is performed by the image processor 104, is to be compressed and stored in a recording medium 106, the switches 120 and 123 are respectively connected to position b. When a predetermined amount of data is accumulated in the temporary storage 101, the accumulated data is read out of the temporary storage 101 and transferred to a decompression processor 122 through the memory I/F 109. This is done because the image processing device 116, which performs image processing, requires raw data which has not been compressed. The data decompressed by the decompression processor 122 is transmitted to the image processing device 116. In the image processing device 116, the image processor 104 performs image processing such as white balance processing, γ conversion processing or the like. Then, the compression processor 105 performs data compression and the data is transferred to the CPU bus 115 through a bus I/F 111. Note that, as mentioned above, the access speed of the temporary storage 101 is sufficiently faster than the processing speed of the CCD. Thus, even if the processing speed of the image processing device 116 is slow, the speed of serial image sensing does not fall behind the processing speed of the CCD. The image processing device 116 is controlled by a controller 110.

The data transferred to the CPU bus 115 is temporarily stored in a temporary storage 102. The CPU 108 monitors the temporary storage 102. When a predetermined amount of data is accumulated in the temporary storage 102, the accumulated data is ultimately stored in the recording medium 106 through the CPU bus 115. Herein, the recording medium 106 is, for instance, a PC card or hard disc or the like. The image recording apparatus according to the fifth embodiment comprises recording means for recording data in a recording medium of this type.

The temporary storage 102 serves to reduce the difference between the processing speed of the image processing device 116 and the access speed of the recording medium 106. More specifically, since the access speed of the temporary storage 102 is sufficiently faster than the processing speed of the image processing device 116, even if the access speed of the recording medium 106 is so slow that the previous processing has to be stopped, the processing speed of the image processing device 116 is not affected.

The image data stored in the recording medium 106 can be displayed on a liquid crystal display (LCD) 113 via the CPU 108. An image to be displayed can be selected by an operation panel 112. The operation panel 112 is also used for setting various parameters for the image processing device. In the ROM 114, commands or the like for operating the CPU 108 are stored.

The temporary storages 101 and 102 are configured with, for instance, SDRAM, and have a sufficiently fast access speed for accessing other processing units. Thus, processing does not congest in the temporary storages 101 and 102. Moreover, the compression method of the compression processors 105 and 121 may be the same or different.

According to the above-described method, since data is compressed before storing the data in the temporary storage 101, a larger number of serially sensed frames than that of the conventional example can be obtained.

Furthermore, the number of serially sensed frames achieved conventionally can be realized with a small memory capacity, without reducing the speed of serial image sensing.

[Fifth Embodiment]

Referring to FIG. 5, in a case where raw data sensed by the CCD 103 is to be stored in the recording medium 106, the compression processor 121 employs a compression method, such as Loss Less JPEG, which has no image deterioration (loss). By virtue of this, a user can arbitrarily perform image processing on the raw data, sensed by the CCD, by using a desired image processing tool.

In a case where data, on which image processing is performed, is to be stored in the recording medium 106, in other words, in a case where a user desires immediate output of a good-quality image without image processing after sensing an image, the compression processor 105 employs a compression method, such as Lossy JPEG, which compresses data at a high compression rate but tolerates image deterioration to a certain degree.

The above methods can satisfy both users who desire raw data on which image processing has not been performed and users who desire good-quality images upon which image processing has been performed. Furthermore, since the compression processor 121 performs compression processing before data is stored in the temporary storage 101, the effects similar to that of the fourth embodiment can be achieved.

[Sixth Embodiment]

Figure 6:
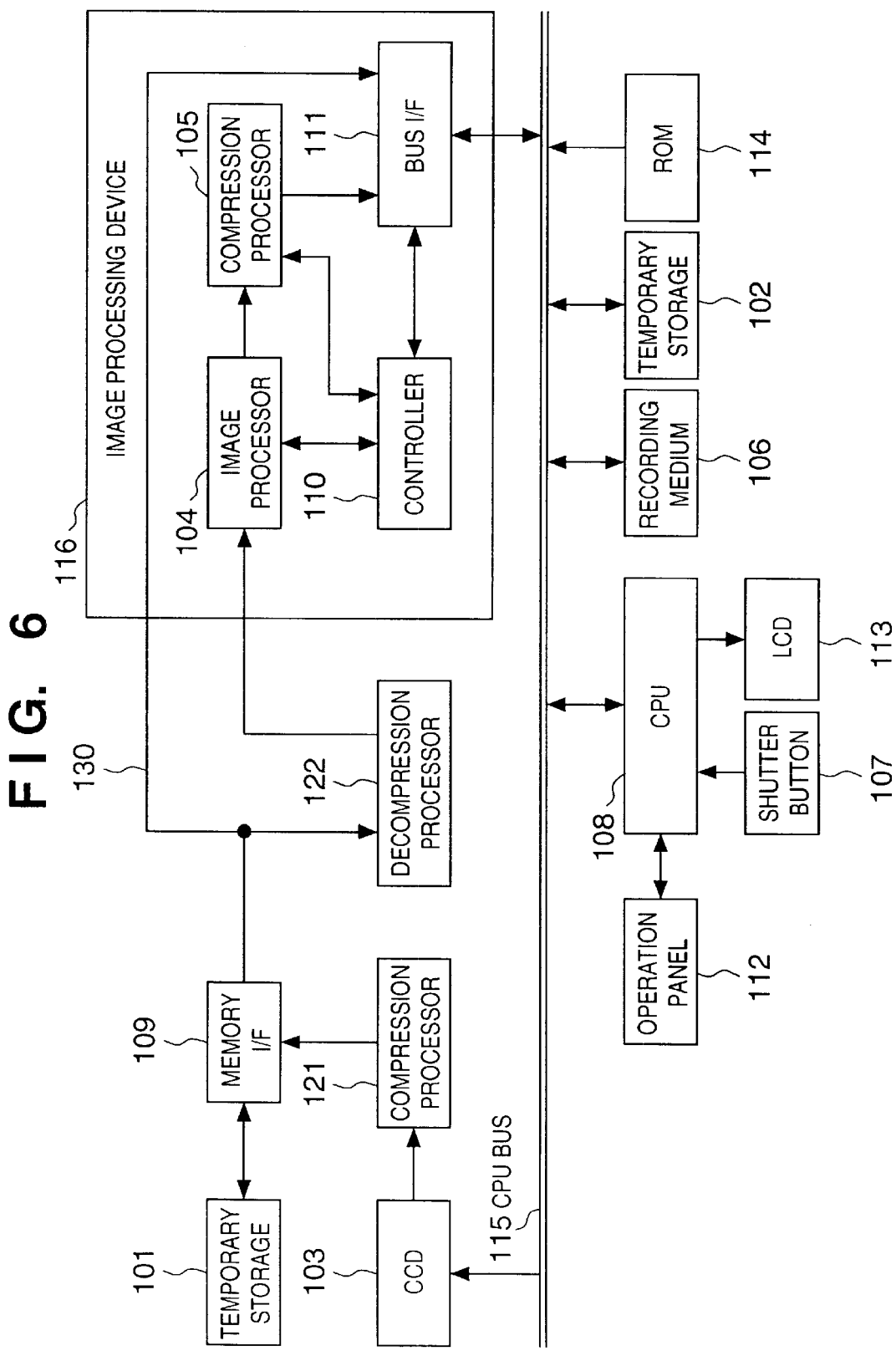
FIG. 6 is a block diagram showing an image recording apparatus according to the sixth embodiment of the present invention.

FIG. 6 is a block diagram showing an image recording apparatus according to the sixth embodiment of the present invention. In FIG. 6, components identical to those in FIG. 5 are referred to by the same reference numerals and detailed description thereof will be omitted.

The sixth embodiment differs from the fourth and fifth embodiments by eliminating the switches 120 and 123 shown in FIG. 5.

When a predetermined amount of data is accumulated in the temporary storage 101, the accumulated data is read out of the temporary storage 101 and transferred to the memory I/F 109, then through a data bus 130 to the bus I/F 111. Also, the data read out of the temporary storage 101 is transferred to the decompression processor 122 through the memory I/F 109. The data decompressed by the decompression processor 122 is transmitted to the image processing device 116. In the image processing device 116, the image processor 104 performs image processing such as white balance processing, γ conversion processing or the like. Then, the compression processor 105 performs data compression and the data is transferred to the bus I/F 111. In the bus I/F 111, an arbitrator function (not shown) arbitrates between the data transmitted by the data bus 130 and data transmitted by the compression processor 105, and transmits the arbitrated data to the CPU bus 115.

The data transferred to the CPU bus 115 is temporarily stored in the temporary storage 102. The CPU 108 monitors the temporary storage 102. When a predetermined amount of data is accumulated in the temporary storage 102, the accumulated data is ultimately stored in the recording medium 106 through the CPU bus 115. The recording medium 106 stores data, on which image processing is performed by the image processor 104 and compression processing is performed by the compression processor 105, and data on which compression processing only is performed by the compression processor 121.

The above-described method enables a user to arbitrarily obtain raw image data, on which image processing has not been performed, and good-quality image data on which image processing has been performed. Furthermore, since the compression processor 121 performs compression processing before data is stored in the temporary storage 101, the effects similar to that of the fourth embodiment can be achieved.

As has been set forth above, according to the above-described fourth to sixth embodiments, a large number of serially sensed frames can be obtained at low cost with a small memory capacity.

Furthermore, a single image recording apparatus enables a user to obtain both the raw data sensed by a CCD, and data on which image processing has been performed for excellent image quality. Moreover, since these data is compressed, a large number of serially sensed frames can be achieved.

[Other Embodiments]

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium (or recording medium), storing program codes of software which realize the above-described functions of the present embodiments, to a computer system or apparatus, reading the program codes, by a CPU or MPU of the computer system or apparatus, from the storage medium, then executing the program. In this case, the program codes read from the storage medium realize the functions according to the above-described embodiments, and the storage medium storing the program codes constitutes the invention. Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. A hand-held image recording apparatus comprising:
   photoelectric conversion means for converting light from an object to an electric signal;
   first temporary storage means for temporarily storing data outputted by said photoelectric conversion means;
   image processing means for performing image processing, including white balance processing and compression processing, on the data read out of the first temporary storage means;
   secondary temporary storage means for temporary storing the data, on which image processing has been performed by said image processing means; and
   recording means for recording the data, read out of said second temporary storage means, in a recording medium.

2. The image recording apparatus according to claim 1, wherein each of said first temporary storage means and second temporary storage means has a capacity large enough to store image data for one frame.

3. The image recording apparatus according to claim 1, wherein a capacity of said first temporary storage means is larger than a capacity of said second temporary storage means.

4. The image recording apparatus according to claim 1, wherein a capacity of said second temporary storage means is larger than a capacity of said first temporary storage means.

5. The image recording apparatus according to claim 1, wherein a capacity of said first temporary storage means and a capacity of said second temporary storage means are variable.

6. The image recording apparatus according to claim 1, wherein said photoelectric conversion means comprises a photoelectric converter capable of reading at high speed by virtue of having two read lines.

7. The image recording apparatus according to claim 1, wherein each of said first temporary storage means and said second temporary storage means has an independent bus for increasing an access speed.

8. The image recording apparatus according to claim 1, wherein in accordance with each capacity of said first temporary storage means and second temporary storage means, a most appropriate value for a quantization table, used for said compression, is obtained and set.

9. An image recording method using a hand-held image recording apparatus comprising:
   a photoelectric conversion step of converting light from an object to an electric signal;
   a first temporary storage step of temporarily storing data obtained in said photoelectric conversion step;
   an image processing step of reading the data, stored in said first temporary storage step, and performing image processing, including white balance processing and compression processing, on the read data;

a second temporary storage step of temporarily storing the data, on which image processing has been performed in said image processing step; and a recording step of reading the data, stored in said second temporary storage step, and recording the read data in a recording medium.

10. A storage medium storing a control program for controlling a hand-held image recording apparatus, said control program including:

program code means for a photoelectric conversion step of converting light from an object to an electric signal;

program code means for a first temporary storage step of temporarily storing data obtained in said photoelectric conversion step;

program code means for an image processing step of reading the data, stored in said first temporary storage step, and performing image processing, including white balance processing and compression processing, on the read data;

program code means for a second temporary storage step of temporarily storing the data, on which image processing has been performed in said image processing step; and program code means for a recording step of reading the data, stored in said second temporary storage step, and recording the read data in a recording medium.

11. An image recording apparatus comprising:

photoelectric conversion means for converting light from an object to an electric signal;

a first compressing processor of compressing data outputted by said photoelectric conversion means;

first temporary storage means for temporarily storing the data compressed by said first compression processor;

a decompression processor for decompressing the compressed data read out of said first temporary storage means;

first switch means for selectively transferring the data compressed by said decompression processor, or the data on which decompression processing is not performed, to a circuit of the subsequent step;

image processing means for receiving the data from said first switch means and performing image processing including a second compression processing;

second switch means for selectively transferring the data on which image processing has been performed by said image processing means, or the data on which image processing is not performed by said image processing means, to a circuit of the subsequent step;

secondary temporary storage means for receiving the data from said second switch means and temporarily storing the received data; and recording means for recording the data, read out of said second temporary storage means, in a recording medium.

12. The image recording apparatus according to claim 11, wherein said first compression processor and said second decompression processor employ a loss-less method for data compression and decompression.

13. The image recording apparatus according to claim 11, wherein said second compression processor employs a compression method, which has a higher compression rate than that of the compression method employed by said first compression processor, and which tolerates data loss.

14. An image recording apparatus comprising:

photoelectric conversion means for converting light from an object to an electric signal;

a first compression processor for compressing data outputted by said photoelectric conversion means;

first temporary storage means temporarily storing the data compressed by said first compression processor;

a decompression processor for decompressing the compressed data read out of the first temporary storage means;

image processing means for receiving the data from said decompression processor and performing image processing including second compression processing;

second temporary storage means for temporarily storing two types of data: data which has been read out of said first temporary storage means and not processed by said compression processor or said image processing means, and data which has been processed by said decompression processor and said image processing means; and recording means for recording the two types of data, read out of said second temporary storage means, in a recording medium.

15. An image recording method comprising:

a photoelectric conversion step of converting light from an object to an electric signal;

a first compression processing step of compressing data obtained in said photoelectric conversion step;

a first temporary storage step of temporarily storing the data compressed in said first compression processing step;

a decompression processing step of reading the compressed data stored in said first temporary storage step and decompressing the data;

a first switching step of selectively transferring the data compressed in said decompression step, or the data on which decompression processing is not performed, to a circuit of the subsequent step;

an image processing step of receiving the data from said first switching step and performing image processing including second compression processing;

a second switching step of selectively transferring the data on which image processing has been performed in said image processing step, or the data on which image processing is not performed in said image processing step, to a circuit of the subsequent step;

a second temporary storage step of receiving the data from said second switching step and temporarily storing the received data; and a recording step of reading the data stored in said second temporary storage step and recording the read data in a recording medium.

16. An image recording method comprising:

a photoelectric conversion step of converting light from an object to an electric signal;

a first compression processing step of compressing data obtained in said photoelectric conversion step;

a first temporary storage step of temporarily storing the data compressed in said first compression processing step;

a decompression processing step of reading the compressed data stored in said first temporary storage step and decompressing the data;

an image processing step of receiving the data from said decompression processing step and performing image processing including second compression processing;

a second temporary storage step of temporarily storing two types of data; data which has been stored in said first temporary storage step, then read out, and not processed in said decompression processing step or said image processing step, and data which has been processed in said decompression processing step and said image processing step; and a recording step of reading the two types of data stored in said second temporary storage step and recording the read data in a recording medium.

17. A storage medium storing a control program for controlling an image recording apparatus, said control program including:

program code means for a photoelectric conversion step of converting light from an object to an electric signal;

program code means for a first compression processing step of compressing data obtained in said photoelectric conversion step;

program code means for a first temporary storage step of temporarily storing the data compressed in said first compression processing step;

program code means for a decompression processing step of reading the compressed data stored in said first temporary storage step and decompressing the data;

program code means for a first switching step of selectively transferring the data decompressed in said decompression step, or the data on which decompression processing is not performed, to a circuit of the subsequent step;

program code means for an image processing step of receiving the data from said first switching step and performing image processing including second compression processing;

program code means for a second switching step of selectively transferring the data on which image processing has been performed in said image processing step, or the data on which image processing has not been performed in said image processing step, to a circuit of the subsequent step;

program code means for a second temporary storage step of receiving the data from said second switching step and temporarily storing the received data; and program code means for a recording step of reading the data stored in said second temporary storage step and recording the read data in a recording medium.

18. A storage medium storing a control program for controlling an image recording apparatus, said control program including:

program code means for a photoelectric conversion step of converting light from an object to an electric signal;

program code means for a first compression processing step of compressing data obtained in said photoelectric conversion step;

program code means for a first temporary storage step of temporarily storing the data compressed in said first compression processing step;

program code means for a decompression processing step of reading the compressed data stored in said first temporary storage step and decompressing the read data;

program code means for an image processing step of receiving the data from said decompression processing step and performing image processing including second compression processing;

program code means for a second temporary storage step of temporarily storing two types of data; data which has been stored in said first temporary storage step, then read out, and not processed in said decompression processing step or said image processing step, and data which has been processed in said decompression processing step and said image processing step; and program code means for a recording step of reading the two types of data stored in said second temporary storage step and recording the read data in a recording medium.

\* \* \* \* \*